(12) United States Patent
Klicpera

(10) Patent No.: US 8,893,320 B2
(45) Date of Patent: Nov. 25, 2014

(54) WATER DISPENSING APPARATUS WITH ACTIVATION AND/OR DEACTIVATION MEANS

(76) Inventor: Michael Klicpera, La Jolla, CA (US)

( * ) Notice: Subject to any disclaimer, the term of this patent is extended or adjusted under 35 U.S.C. 154(b) by 7 days.

(21) Appl. No.: 13/491,201

(22) Filed: Jun. 7, 2012

(65) Prior Publication Data
US 2012/0234409 A1 Sep. 20, 2012

Related U.S. Application Data

(63) Continuation of application No. 11/877,860, filed on Oct. 24, 2007, and a continuation of application No. 12/539,150, filed on Aug. 11, 2009, and a continuation of application No. 12/956,031, filed on Nov. 30, 2010, and a continuation of application No. 13/216,497, filed on Aug. 24, 2011, and a continuation of application No. 13/216,521, filed on Aug. 24, 2011.

(51) Int. Cl.
| | |
|---|---|
| A47K 1/04 | (2006.01) |
| B05B 12/00 | (2006.01) |
| B05B 12/02 | (2006.01) |
| E03C 1/04 | (2006.01) |
| G01F 15/02 | (2006.01) |
| G01F 15/06 | (2006.01) |
| G01F 15/075 | (2006.01) |
| G01K 13/02 | (2006.01) |
| B05B 1/18 | (2006.01) |

(52) U.S. Cl.
CPC ............. *B05B 12/004* (2013.01); *B05B 12/008* (2013.01); *B05B 12/02* (2013.01); *E03C 1/04* (2013.01); *G01F 15/024* (2013.01); *G01F 15/063* (2013.01); *G01F 15/075* (2013.01); *G01F 15/0755* (2013.01); *G01K 13/02* (2013.01); *B05B 1/18* (2013.01); *E03C 2001/0418* (2013.01); *G01K 2013/026* (2013.01); *G01K 2207/00* (2013.01)
USPC .................................................. 4/615; 4/601

(58) Field of Classification Search
USPC .............................................. 4/615, 597, 601
See application file for complete search history.

(56) References Cited

U.S. PATENT DOCUMENTS

| | | |
|---|---|---|
| 4,867,189 A | 9/1989 | Moineau |
| 4,944,049 A | 7/1990 | Leonard |

(Continued)

FOREIGN PATENT DOCUMENTS

WO    WO 2006073318 A1 * 7/2006

OTHER PUBLICATIONS

WO 2006/073318.*

*Primary Examiner* — Lauren Crane
(74) *Attorney, Agent, or Firm* — Michael Edward Klicpera

(57) ABSTRACT

The present invention is a display apparatus for affixation to a shower or bath water supply piping or incorporated within a shower, or bath or faucet head that has an authorization means for activating water flow. In a second embodiment, the present invention comprises a dispensing apparatus that has authorization means for activating and/or deactivating water flow. The display and dispensing apparatuses include a power generation, a microprocessor, water flow sensors, timing circuits and a display means and optional wireless communication technology and optional temperature sensors. The display means can be an analog or digital display or combination of display means. The authorization means can comprise a key pad located as soft keys on the display apparatus, a remote key pad, an identification or electronic card means, a bar code or RFTD means, or a biometric means.

28 Claims, 5 Drawing Sheets

(56) References Cited

U.S. PATENT DOCUMENTS

| | | | |
|---|---|---|---|
| 6,016,836 A * | 1/2000 | Brunkhardt | 137/624.11 |
| 6,892,952 B2 | 5/2005 | Chang | |
| 6,925,661 B1 * | 8/2005 | Anger | 4/559 |
| 6,997,064 B2 | 2/2006 | Bird | |
| 7,032,435 B2 * | 4/2006 | Hassenflug | 73/46 |
| 7,360,413 B2 | 4/2008 | Jeffries | |
| 7,761,937 B2 | 7/2010 | Foutz | |
| 7,857,234 B2 | 12/2010 | Thorne | |
| 2008/0103636 A1 * | 5/2008 | Glenn et al. | 700/302 |
| 2008/0148476 A1 | 6/2008 | Lin | |
| 2011/0260827 A1 | 10/2011 | Shapiro | |

* cited by examiner

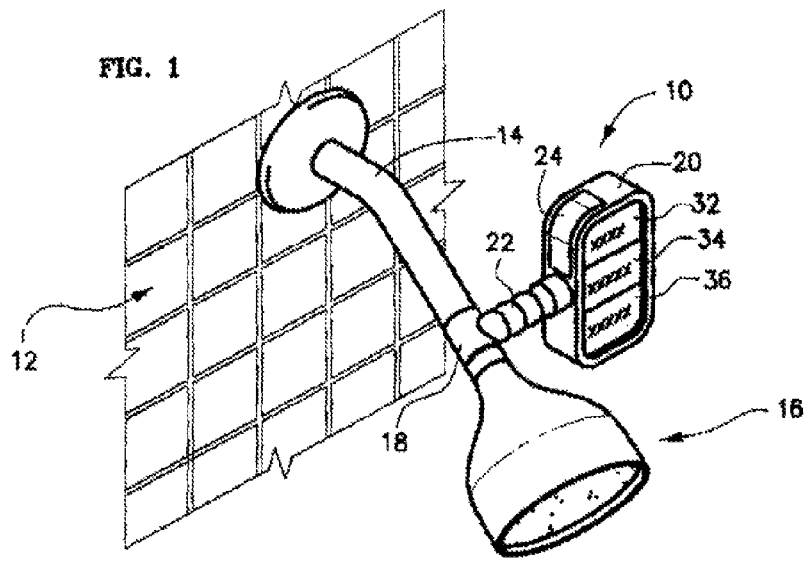
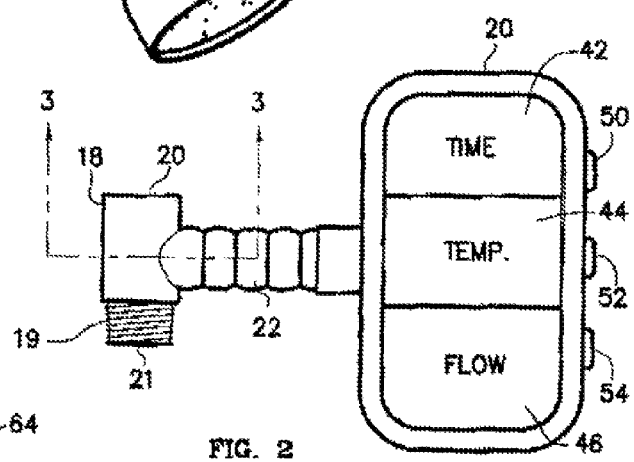
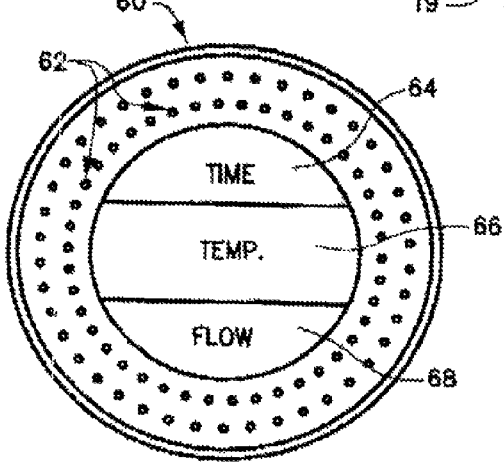
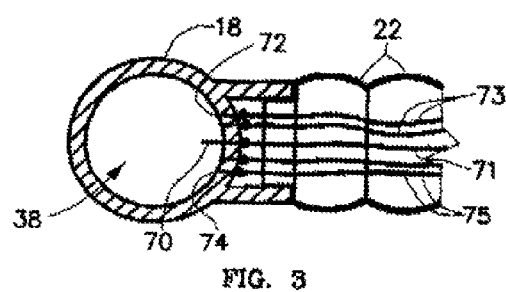
FIG. 1
FIG. 2
FIG. 4
FIG. 3

WATER DISPENSING APPARATUS WITH ACTIVATION AND/OR DEACTIVATION MEANS

RELATED APPLICATIONS

This application is a continuation-in-part of U.S. patent application Ser. No. 11/877,860 filed on Oct. 24, 2007, U.S. patent application Ser. No. 12/539,150 filed on Aug. 11, 2009, U.S. patent application Ser. No. 12/956,031 filed on Nov. 11, 2010, U.S. patent application Ser. No. 13/216,497 filed on Aug. 24, 2011 and U.S. patent application Ser. No. 13/21,521 filed on Aug. 24, 2011. All of these Applications are incorporated herein by this reference.

FIELD OF THE INVENTION

This apparatus and the method of use relates to shower or bath heads and water supply piping, more particularly, to shower head, bath or water supply piping having a visual analog or digital display of certain parameters of the supplied water, such as the temperature, flow rate, and time and timing parameters.

BACKGROUND OF THE INVENTION

Water conservation is becoming more recognized as an important factor for humanity. The water sources that are stored in reservoirs, aquifers, and other surface storage facilities are in a constant state of demand and atmospheric conditions are highly variable. Drought conditions are typical in many areas of the world and during these conditions, the water supply becomes strangled leading to scarcity where cut-backs are or will be required. Many states in the US, and international countries like China and India which have large populations, and Pakistan, Iran, Australia and Mexico, are putting extreme demands on water supplies that depleting the water sources and underground aquifers. Water conservation is becoming a major issue for many cities and an apparatus for monitoring water usage at a specific residential or corporate site could be useful in supporting water conservation. The present invention, which is a CIP of several other related water monitoring and control patent applications, is focusing on promoting water conservation.

It is known that the average shower used in a home or rental consumes 19.4% of the total indoor residential water use. Shower water use at hotels, motels, and exercise and gym facilities is considerable hence the promotion of frugal and prudent shower water use is an important step in overall water conservation.

Conventional shower head designs include those having a shower head housing with a plurality of passageways allowing various water sprays to flow from the shower head. Furthermore, shower heads having a surface with a plurality of passageways, or nozzle orifices which utilize a backing disk having a plurality of resilient and flexible nozzle tips protruding through the nozzle orifices are known. The resilient nozzles of these known shower heads allow for convenient elimination of the build-up of calcium or other deposits by manually flexing the resilient nozzles when it appears that material is collecting therein. In these known shower heads, the entire nozzle is formed of a resilient and flexible rubber which does not match the finish of, e.g., a brass or chrome shower head.

The use of adjustable shower heads is known in the prior art. More specifically, adjustable shower heads heretofore devised and utilized are known to consist basically of familiar, expected and obvious structural configurations, notwithstanding the myriad of designs encompassed by the crowded prior art which have been developed for the fulfillment of countless objectives and requirements.

One type of an adjustable shower head and water supply piping assemblies are conventionally constituted by a hose which may be in the form of a flexible tube protected by metal coils or in the form of a plastic hose optionally including braiding. In either case, the hose is generally linear in shape and has a length lying in the range 1.25 meters (m) to 2 m. When not in use, the hose hangs down into a bath tub or other bathroom fitting where it is often dirtied by contact with dirty water.

Sometimes the hose can be hidden away in a chute (requiring a hole to be made), in which case it dirties a volume that is inaccessible for cleaning. The hole often leads to water seeping under the bath tub. Furthermore, these drawbacks (difficulty of storage and problems with dirt) make it undesirable to install a longer hose, even though a longer hose would often be convenient when the shower head is in use. As a result of shower hoses not being long enough, they are often damaged by the user pulling on them.

Anti-scalding pressure balance and thermostatic temperature control valves are becoming an important part in bathroom plumbing because the attempt to minimize scalding and cold water shocks that can occur in a shower when a toilet is flushed or a faucet is turned on.

Accordingly, a need remains for an adjustable shower or bath head or water supply piping with displays either with analog or digital means certain parameters, such as time on, flow rate, total volume, and temperature, in order to overcome or supplement the above-noted shortcomings. The present invention satisfies such a need by providing an adjustable shower head or shower assembly piece that is convenient and easy to use, provides adequate reach and adjusting capabilities for various applications, and is attractive in appearance.

In additional, this is a need for an adjustable shower or bath head or water supply piping monitors water usage to encourage water savings and promote careful conscientious use of water and energy resources.

SUMMARY OF THE INVENTION

The present invention is a display apparatus for affixation to a shower or bath water supply piping or incorporated within a shower, or bath or faucet head that has an authorization means for activating water flow. In a second embodiment, the present invention comprises a dispensing apparatus that has authorization means for activating and/or deactivating water flow. The display and dispensing apparatuses include a power generation, a microprocessor, water flow sensors, timing circuits and a display means and optional wireless communication technology and optional temperature sensors. The display means can be an analog or digital display or combination of display means. Ergonomically placed buttons can be incorporated into the display means to change parameter units (e.g. metric to US), set alarm conditions (e.g. temperature over set point, time past a set point, volume (gallons) that passed a set point). The display means must be able to provide sufficient lighting in shower conditions. In addition, the display means must be able to sustain capability in moist wet conditions. In the embodiment defined by the attached shower display apparatus, know piping joint technology will be used for installation into both new and presently installed shower systems. The authorization means can comprise a key pad located as soft keys on the display apparatus, a remote key pad, an identification or electronic card means, a bar code or RFTD means, or a biometric means.

BRIEF DESCRIPTION OF THE DRAWINGS

FIG. 1 is a perspective view of the embodiment comprising the display apparatus attached to the shower head's water supply piping, an articulated joint mechanism, and including a shower head in accordance with the present invention.

FIG. 2 is a front view of a typical display means showing the articulated joint mechanism and selection buttons on the side of the display means body.

FIG. 3 is a cross-section taken from the 3-3 line on FIG. 2 showing the sensors and there relative position of the sensors in the supply line lumen and the connecting wires for the display means.

FIG. 4 is a perspective view of the second embodiment showing the display apparatus incorporated within the shower head in accordance with the present invention.

Corresponding reference characters indicate corresponding parts throughout the several views. The exemplifications set out herein illustrate exemplary embodiments of the invention, and such exemplifications are not to be construed as limiting the scope of the invention in any manner.

DESCRIPTION OF THE PREFERRED EMBODIMENTS

Figure 5:
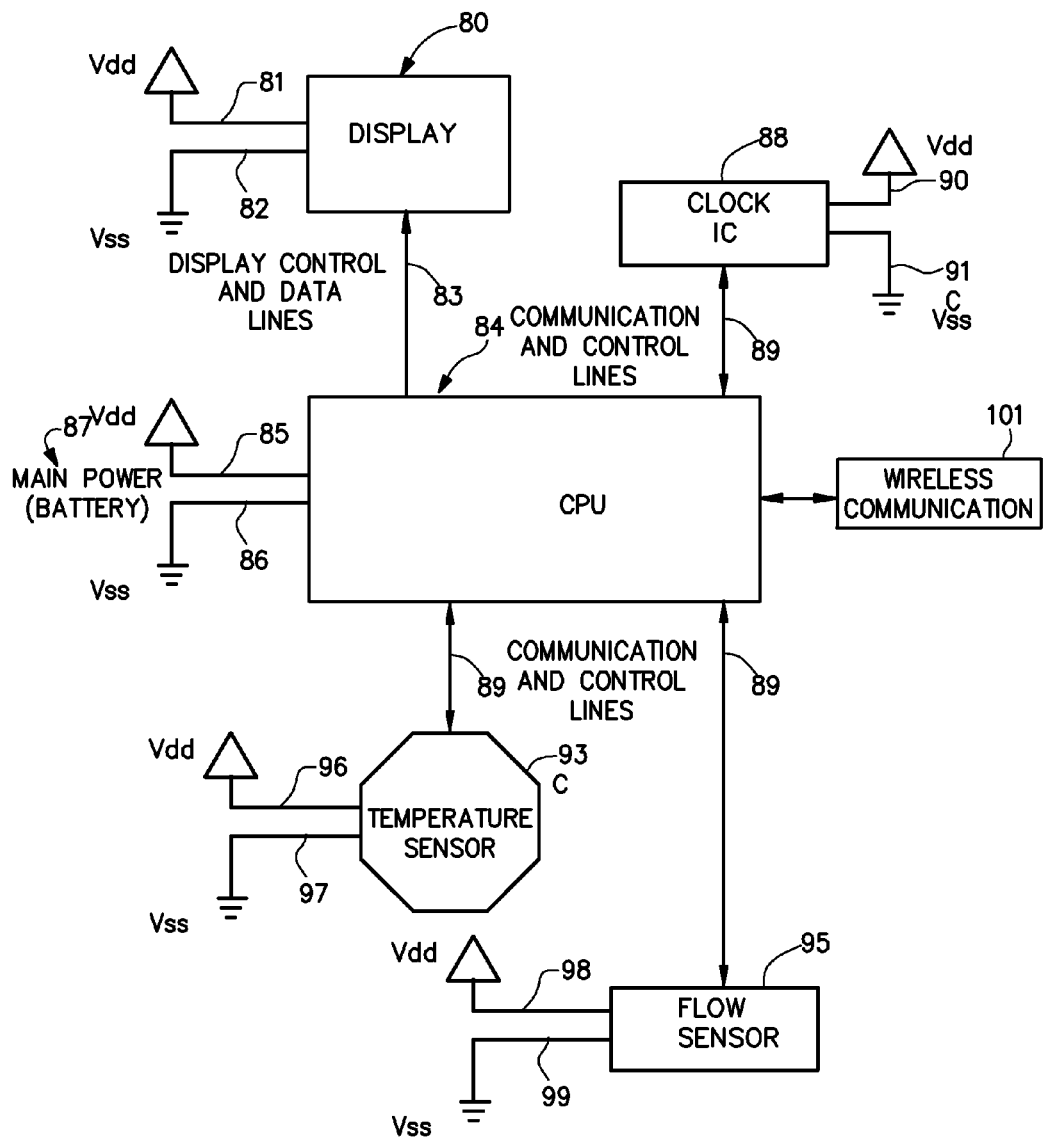
FIG. 5 is an electrical schematic showing the main power, CPU or microprocessor, the analog or digital display means, the clock circuit, the temperature sensor and the flow sensor.

Referring now to the drawings and particularly to FIG. 1 is a perspective view of the embodiment comprising the first embodiment of the display apparatus 10 attached to the shower or bath head's water supply piping 14 extending from a typical shower or bath wall 12, a water pipe union or joint 18, an articulated joint mechanism 22, and including a general shower head 16 in accordance with the present invention. The first embodiment of the show display apparatus 10 is designed to become attached to the shower or bath head's water supply piping in easily installation and aesthetically pleasing format. The component's of the first embodiment of the present invention include a water pipe joint union or section 18, an extending or articulating joint section 22, and a housing section 20 containing the power source with a water proof removable cover 24, a computer apparatus and first 32, second 34 and third 36 parameter display mechanisms.

The water pipe union or joint 18 can be fabricated from typical metallic piping materials such as brass, brass alloys, steel, galvanized steel, copper, copper allows or any combination thereof. The water pipe joint can be fabricated from a number of polymeric materials, such as polyvinyl chloride (PVC), polybutylene, acryaontirile-butadiene-styrene (ABS), rubber modified styrene, polypropylene, polyacetal, polyethylene, or nylon. The base material can be painted white or colored finishes or coated with various brass, silver and gold type materials to accommodate the match with various presently marketed finishes. As shown in FIG. 2, the water pipe union generally has a female thread (not shown) within the input end 20 for engaging the treads of a typical water supply pipe and a male thread 19 on the output end 21 for engaging the female threads of the typical shower head 16 or bath supply means. For certain applications, the male/female thread locations can be changed to accommodate certain attachment forms or specifications. In addition, other attachment means, such as adhesive, snap fit joint, compression fitting, flare fitting or other technologies can be employed.

The material for fabricating the water pipe union 18 is not particularly important except that the joint has to engage the extending or articulating joint with a relatively water tight seal, and that preferably there should be a sealing means that functions 1) to secure in place, any parameter sensors that are projecting into the water stream and 2) to provide a water-tight seal that can prevent any water from penetrating past the seal (and into the shaft). Various washer designs fabricated from compounds of rubber, urethane, elastomeric or thermosetting polymeric compounds have been disclosed and are in present in similar uses. Seal and sealing technology is well known in the art. In addition, there should be a continuous lumen or means from the water pipe union and through the extending or articulating shaft such that the electrical connection means from the sensors can be engaged to the computer/display mechanism in the display housing 20. In is anticipated by the Applicant that the sealing means can be placed in another location, for example, on the other end of the shaft, in any preferable location. The joint between the water pipe union and the extending or articulating shaft could be screw and thread technology, snap fit, compression fitting, flare fitting, or use adhesive technology. For example, in the case of fabricating with a metallic component, a solder, brazed, or sweat joint could be used. For example, in the case of polymeric, the extending or articulating could be an extension of the display apparatus manufactured by molding, heat bonding, or adhesive technology. The joint may be designed to be permanent or removable.

The material for fabricating the extending or articulating shaft 22 can be a metallic material such as brass, brass and bronze alloys, steel, galvanized steel, copper, copper alloys or any combination thereof. The extending or articulating shaft can be fabricated from a number of polymeric materials, such as polyvinyl chloride (PVC), polyethylene, polybutylene, acryaontirile-butadiene-styrene (ABS), rubber modified styrene, polypropylene, polyacetal, polyethylene, or nylon. The base material can be painted white or colored finishes or coated with various brass, silver and gold type materials to accommodate the match with various presently marketed finishes.

The material for fabricating the extending or articulating shaft 22 is not particularly important except that the joint has to engage the water pipe union with a water tight seal, and that the other end should be designed to engage the display housing. In addition, the articulating may also have water protection means, such as have water tight joints the form the articulation, or surrounding the lumen and electrical connections with a protective jacket or barrier. Also, there should be a lumen or one or more holes for receiving the electrical connection means from the sensors. The extending or articulating shaft is engaged to the computer/display housing 20. The joint between the water pipe union and the extending or articulating shaft, as previously disclosed, could be screw and thread fitting, compression fitting, flare fitting, or use adhesive technology. For example, in the case of fabricating with a metallic component, a solder, brazed, or sweat joint could be used. For example, in the case of polymeric, the extending or articulating could be an extension of the display apparatus manufactured by molding, heat bonding, or adhesive technology. The joint may be designed to be permanent or removable.

Now referring to FIG. 2, the first embodiment of the present invention display apparatus 10 includes a housing 20, a computerized circuit board having a power source 87 (depicted in FIG. 5), the display means housing having a water tight door 24 for replacing or regenerating the power source (shown in FIG. 1) and an one or more buttons or activators that allow for certain modification of the software instructions (change units, input timing, alarms). The housing 20 can be fabricated from a metallic material such as brass, brass alloys, steel, galvanized steel, copper, copper allows or any combination thereof. The display means housing can be fabricated from a number of polymeric materials, such as polyvinyl chloride (PVC), polyethylene, polybutylene, acryaontirile-butadiene-styrene (ABS), rubber modified styrene, polypropylene, polyacetal, polyethylene, or nylon. The base material can be painted white or colored finishes or coated with various brass, silver and gold type materials to accommodate the match with various presently marketed finishes.

The material for fabricating the display means housing 20 is not particularly important except that the joint has to engage the extending or articulating joint with a water tight seal and be of sufficient size and weight to contain the electrical and power components housing. The size of the display means will generally determine the size of the housing but it does not have to be substantially rectangular as shown, any number of geometric configurations could be used in the present invention. addition, the articulating may also have water protection means, such as have water tight joints the form the articulation, or surrounding the lumen and electrical connections with a protective jacket or barrier. Also, there should be a lumen or one or more holes for receiving the electrical connection means from the sensors. The extending or articulating can be engaged to the computer/display mechanism in the display housing. The joint between the water pipe joint and the extending or articulating joint could be screw and thread fitting, compression fitting, flare fitting, use adhesive technology. In the case of fabricating with a metallic component, a solder, brazed, or sweat joint could be used. In the case of polymeric, the extending or articulating could be an extension of the display apparatus manufactured by molding or heat bonding technology. The joint may be designed to be permanent or removable.

The display (as presented in FIG. 1 in general means 32, 34, and 36 and as presented in FIG. 2 in more detail 42, 44 and 46) utilizes one or more illuminating technologies, such as LCD, LED, gas plasma, fluorescence, incandescent, halogen, halide, or other lighting technologies but must able to provide sufficient lighting for observing the data in shower conditions. In addition, the display means and display means housing must be able to sustain capability in moist wet conditions. The present invention can include one or more than one display parameter. For example, a unit with only the temperature display can be manufactured to reduce overall costs. Furthermore, the orientation of the parameters 42, 44, and 46 presented can be changed, for example, the flow parameter can be on top with the time parameter on the bottom and with the temperature parameter sandwiched between. The displays 42, 44, and 46 can have a background light that is used for various purposes, for example, for providing better lighting conditions or changing color e.g. from green to red, to display an alarming condition. Displaying of all water parameters 42, 44 and 46 can utilize a gang multiple LCD, LED, gas plasma, fluorescence, incandescent, halogen, halide, or other lighting technologies separate displays, custom displays, graphic displays or a single line display which sufficient digits that sequences the presentation of the water parameters 42, 44, and 46 one at a time with a specific delay and sequencing. An example of a LCD unit that can be used with the present invention is the color graphic 128×128 LCD-00569 marketed by Sparkfun Electronics in Boulder, Colo. It is anticipated by the Applicants that there are other variants and other LCD, LED, gas plasma, fluorescence, incandescent, halogen, halide, or other lighting technologies that can be utilized with the present invention.

Not shown in FIG. 1 or 2 (but described in more detail in 5), is a CPU or microprocessor and associated circuitry mounted on a electronic circuit board to control the display means and communicate with the sensors. The CPU or microprocessor and associated circuitry mounted on an electronic circuit board can also have the capability to be programmed for controlling certain display means (e.g. U.S. or metric units), programming certain alarm or setting states (e.g. flash all display means red when the total volume has exceeded a certain volume, for example, 15 gallons).

The display assembly can be programmed to display one or more parameters in a visual means that can be either an analog, character or digital display, or combination of display means. Information obtained from the appropriate sensor monitoring or measuring the water parameters such as temperature, shower time (water on), and flow rate can be displayed in an appropriate format on the display means. For example, when a sensor is monitoring the shower temperature of water flowing through the shower head, the display means could show any temperature between 32 degrees Fahrenheit (0 degrees Celsius) and 212 degrees Fahrenheit (100 degrees Celsius), and within a reasonable range of 50 degrees Fahrenheit (10.0 degrees Celsius) and 150 degrees Fahrenheit (65.5 degrees Celsius). For example, when a sensor is monitoring or measuring the rate of water flowing from a water source or through the shower head, the display means could show any flow between 0 gal/min (0 liters/hr) and 100 gal/min, within a reasonable range of 0.2 gal/min (liter/min) to 20 gal/min (liters/min). In additional, when a sensor is monitoring or measuring the rate of water flowing from a water source or through the shower head, the display means could show the total volume of water that has been used, e.g. 23 gallons. Furthermore, the display can be programmed to display calendar information, such as the date and current time (12 hr. or 24 hr. format).

It is anticipated by the Applicant the present invention can be fabricated and marketed with one, two or more display means. For example, a lower cost display assembly can be fabricated and sold that only has a temperature sensor and temperature display means. A more expensive display assembly can be fabricated and sold that has temperature, flow, timing and other sensors with various programmed methods and a shut off mechanism.

Also shown in FIG. 2, one or more ergonomically 50, 52, and/or 54 placed buttons or activators can be incorporated into the display means housing to allow the modification of certain parameter units (e.g. metric to US), set alarm conditions (e.g. temperature over-set point, time past-set point, flow rate-set points), or to program certain settings, e.g. total shower time before shutdown or alarm, monitor continuous leakage (valve not complete shut off). The buttons will electrically communicate with the electronic circuit board contained with the housing 20 and respond to programmed instructions integrated within the CPU or microprocessor and associated circuitry of the electronic circuit board. The buttons or activators 50, 52 and/or 54 should be mounted with the display means housing 20 with the capability to protect the buttons and electronic circuitry with the housing for exposure to moist and wet conditions.

A visual alarm can be incorporated into the present invention whereby a preset alarm or programmed alarm, changes the screen display, for example, blinking a parameter, or changing the color of a parameter (green to red). A preset alarm might include visual reference, for example, an inoperative condition, broken sensor, low power source and some default limits. Programmed visual alarms would allow for individual selection (e.g. temperature over set point, time past set point, flow rate, total volume exceeded set points) which might be restricted or not by the default settings.

In addition, an auditory alarm can be incorporated into the present invention whereby a preset alarm or programmed alarm, changes the screen display, for example, using sound or pulsing a specific noise, or changing the color of a parameter. For example, the temperature display can change from green to red when a preset temperature is crossed. A preset alarm might include visual reference, for example, an inoperative condition, broken sensor, low power source and some default limits. Programmed auditory alarms would allow for individual selection (e.g. temperature over set point, time past set point, flow rate set points) which might be restricted or not by the default settings.

In addition, the present invention can include a water shut off means (not shown) to turn the shower or bath water off if an alarm or setting has been activated. The water shut off means is electrically connected to the CPU or microprocessor and the power means such the computer controls the application of electrical power to activate or de-activate the water shut off means. The water shut off means can comprise, for example, a typical ball valve or solenoid shut off valve incorporate into the connection union such that water from the source is closed such that no water exits the shower or bath water head. For example, many landscape irrigation valves include a low voltage (e.g. 24 volt AC or battery operated) electrical solenoid connected to a valve for turning on and off the water. Such technology could be modified appropriately (e.g. reduce in size, adjust flow rate, use materials designed for hot water) and used as the water shut off means for the present invention. The water shut off means can be activated if an alarm state has been achieved, e.g. shower time of 10 minutes and 10 seconds has expired, or temperature is above 115 degrees Fahrenheit, or the total of 15 gallons of water has flowed since the water source was first opening. The alarm or settings can be a default setting installed by the manufacturer or programmed by the user. In addition, the typical on-off ball valve or solenoid shut off valve, or other valve shut off technology can have a programmable on-off sequence for other purposes, for example, water conservation purposes (e.g. programmed for initial rising 5 minutes and 5 seconds, off for 4 minutes and 4 seconds to apply soap or shampoo, and then on again for 5 minutes and 5 seconds for rising the soap or shampoo off). The times shown above are only provided as an example. The time e.g. 5 minutes and 5 seconds, can be programmed as desired by the user to accomplish the personal needs, e.g. 10 minutes.

In the embodiment defined by the attached shower display apparatus, know piping joint technology, as described above, will be used for installation into both new and presently installed shower and bath systems.

In the embodiment defined by the display means incorporated into the shower head, the shower head/display assembly can also be installed in both new and presently installed shower systems.

As illustrated in FIG. 3 is a cross-section taken from the 3-3 line on FIG. 2 showing the sensors 70, 72 and 74 located within a piping joint connection 22 and there relative position of the sensors in the supply line lumen 38 and the connecting wires 71, 73, and 75 for the display means.

In general, a sensor is a type of transducer. A direct type indicating sensors, for example, a mercury thermometer, is human readable. However, other sensors must be paired with an indicator or display, for instance, thermocouple sensor. Most sensors are electrical or electronic, although other types exist.

Technological progress allows for more and more to be manufactured on the microscopic scale as micro-sensors using MEMS technology. In most cases a micro-sensor reaches a significantly higher speed and sensitivity compared with macroscopic approaches.

There are many types of sensors that can be used with the present invention. Since a significant small change involves an exchange of energy, sensors can be classified according to the type of energy transfer that they detect. For measuring or monitoring the temperature of the water flowing from the shower or bath head, the use of various thermocouples or thermistor sensors 70 as depicted in FIG. 3 is protruding within the water supply lumen 38 (or in close proximity to the water to be measured) and mounted within the articulating joint mechanism 22. Wires 71 are shown extending from the sensor 70 to electronically communicate with the CPU or microprocessor 84 and display unit.

In 1821, the German-Estonian physicist Thomas Johann Seebeck discovered that when any conductor (such as a metal) is subjected to a thermal gradient, it will generate a voltage. This is now known as the thermoelectric effect or Seebeck effect. Any attempt to measure this voltage necessarily involves connecting another conductor to the "hot" end. This additional conductor will then also experience the temperature gradient, and develop a voltage of its own which will oppose the original. Fortunately, the magnitude of the effect depends on the metal in use. Using a dissimilar metal to complete the circuit will have a different voltage generated, leaving a small difference voltage available for measurement, which increases with temperature. This difference can typically be between 1 and 70 micro-volts per degree Celsius for the modern range of available in metal combinations. Certain combinations have become popular as industry standards, driven by cost, availability convenience, melting points, chemical properties, stability, and output.

It is important to note that thermocouples measure the temperature difference between two points, not absolute temperature. In traditional applications, one of the junctions, the cold junction, was maintained at a known (reference) temperature, while the other end was attached to a probe.

For example, the cold junction could be at copper traces on the circuit board. Another temperature sensor will measure the temperature at this point, so that the temperature at the probe lip can be calculated. Having available a known temperature cold junction, while useful for laboratory calibrations, is simply not convenient for most directly connected indicating and control instruments. They incorporate into their circuits an artificial cold junction using some other thermally sensitive device (such as a thermistor or diode) to measure the temperature of the input connections at the instrument, with special care being taken to minimize any temperature gradient between terminals. Hence, the voltage from a known cold junction can be simulated, and the appropriate connection applied. This is known as cold junction compensation.

Additionally, cold junction compensation can be performed by software. Device voltages can be translated into temperatures by two methods. Values cast either be found in look-up tables or approximated using polynomial coefficients.

Any extension cable or compensating cable must be selected to match die thermocouple. It generates a voltage proportional to the difference between the hot junction and cold junction, and is connected in the correct polarity so that the additional voltage is added to the thermocouple voltage, compensating for die temperature difference between the hot end cold junctions.

The relationship between the temperature difference and the output voltage of a thermocouple is generally nonlinear and is approximated by a polynomial interpolation.

$$T = \sum_{n=0}^{N} a_n v^n$$

The coefficients $a_n$ are given for n from 0 to between 5 and 9. To achieve accurate measurements lie equation is usually implemented in a digital controller or stored in a lookup table. Some older devices use analog filters.

A variety of thermocouples are available, suitable for different measurements applications (industrial, scientific, food temperature, medical research, etc.). They are usually selected based on the temperature range and sensitivity needed. Thermocouples with low sensitivities (B, R, and S types) have correspondingly lower resolutions. Other selection criteria include the inertness of the thermocouple material, and whether or not it is magnetic. The thermocouple types are listed below with the positive electrode first, followed by the negative electrode. For example, listed below are a number of thermocouples types.

Type K—Chromel (Nickel-Chromium Alloy)/Alumel (Nickel-Aluminum Alloy). This is the most commonly used general purpose thermocouple. It is inexpensive and, owing to its popularity, available in a wide variety of probes. They are available in the 200° C. to +1200° C. range. Time type K was specified at a time when metallurgy was less advanced than it is today and, consequently, characteristics vary considerably between examples. Another potential problem arises in sonnies situations since one of the constituent materials is magnetic (Nickel). The characteristic of the thermocouple undergoes a step change when a magnetic material readies its Curie point. This occurs for this thermocouple at 354° C. Sensitivity is approximately 41 μV/° C.

Type B—Chromel/Constantan (Copper-Nickel Alloy). Type B has a high output (65 μV/° C.) winch makes it well suited to cryogenic use. Additionally, it is non-magnetic.

Type J—Iron/Constantan. Type J has a limited range (−40 to +750° C.) makes type J generally less popular than type K. The main application is with old equipment that cannot accept modern thermocouples. J types cannot be used above 760° C. as an abrupt magnetic transformation causes permanent de-calibration. The magnetic properties also prevent use in some applications. Type J's have a sensitivity of ~52 μV/° C.

Type N—Nicrosil (Nickel-Chromium-Silicon Alloy)/Nisil (Nickel-Silicon Alloy). Type N thermocouples generally have high stability and resistance to high temperature oxidation which makes Thpe N suitable for high temperature measurements with out the cost of platinum (B, R, 5) types. They can withstand temperatures above 1200 C.°. Sensitivity is about 39 μV/° C. at 900° C., slightly lower than a Type K. Designed to be an improved type K, it is becoming more popular.

Thermocouple types B, R, and S are all noble metal thermocouples and exhibit similar characteristics. They are the most stable of all dieimocouples. but due to their low sensitivity (approximately 10 μV/° C.) they are usually only used for high temperature measurement (>300° C.).

Type B—Platinum 30% Rhodium/Platinum 6% Rhodium. Suited for high temperature measurements up to 1800° C. Type B thermocouples (due to the shape of there temperature-voltage curve) give the same output at 0° C. and 42° C. This makes them useless below 50° C.

Type R—Platinum 13% Rhodium/Platinum. Suited for bight temperature measurements up to 1600° C. Low sensitivity (10 μV/° C.) and high cost makes Type R unsuitable for general purpose use.

Type S—Platinum 10% Rhodium/Platinum. Suited for high temperature measurements up to 1600°. Low sensitivity (10 μV/° C.) and high cost makes them unsuitable for general purpose use. Due to its high stability, Type S is used as the standard of calibration for the melting point of gold (1064.43° C.).

Type T—Copper/Constantan. Suited for measurements in the −200 to 350° C. range. Often used as a differential measurement since only copper wire touches the probes. As both conductors are non-magnetic, type T thermocouples are a popular choice for applications such as electrical generators which contain strong magnetic fields. Type T thermocouples have a sensitivity of ~43 μV/° C.

Type C—Tungsten 5% Rhenium/Tungsten 26% Rhenium. Suited for measurements in the 32 to 4208° F. (0 to 2320 C.°). This thermocouple is well-suited for vacuum furnaces at extremely high temperature and must never be used in the presence of oxygen at temperatures above 500° F.

Type M—Nickel Alloy 19/Nickel-Molybdenum Alloy 20. This type is used in the vacuum furnaces as well for the same reasons as with type C above. Upper temperature is limited to 2500° F. (1400° C.). Though it is a less common type of thermocouple, look-up tables to correlate temperature to EMF (mini-volt output) are available.

A thermistor is a type of resistor used to measure temperature changes, relying on the change in its resistance with changing temperature. Thermistor is a combination of time words thermal and resistor. The thermistor was invented by Samuel Ruben in 1930, and was disclosed in U.S. Pat. No. 2,021,491.

If we assume that the relationship between resistance amid temperature is linear (i.e. we make a first-order approximation), then we can say that:

$$\Delta R = K \Delta T$$

Where:
  ΔR change in resistance
  ΔT=change in temperature
  k=first-order temperature coefficient of resistance Thermistors can be classified into two types depending on the sign of k. If k is positive, the resistance increases with increasing temperature, and the device is called a positive temperature coefficient (PTC) thermistor (Posistor). If is negative, the resistance decreases with in decreasing temperature, and the device is call a negative temperature coefficient (NTC) thermistor.

Thermistors differ from resistance temperature detectors in that the materials used in a thermistor is generally a ceramic or polymer, while RTDs use pure metals. The temperature response is also different; RTDs are useful over larger temperature ranges.

Other thermal technologies that can be employed include temperature sensors: thermometers, bi-metal thermometers and thermostats, heat sensors such as bolometers and calorimeter.

It is anticipated by the Applicant that various types of thermocouples or thermistors can be used for the present invention. It is not important what type of thermocouple or thermistor is utilized for monitoring or measuring the temperature of the water entering the shower head, bath head or water supply lines except that it is accurate for the appropriate temperature range monitored or measured.

In order to monitor or measure the flow rate of the water being delivered by the water supply line to the shower or bath head various flow measuring technologies are applicable to the present invention. For measuring or monitoring the rate of the water flowing through the shower or bath head, the use of various venturi type sensors or pressure sensors 74 as depicted in FIG. 3 are positioned in close proximity to the water to be measured and mounted within the articulating joint mechanism 22. Wires 75 are shown extending from the sensor 74 to electronically communicate with the CPU or microprocessor 84 and display unit.

One means to monitor flow parameter is to create a venturi, which constricts the flow in some fashion, and measure the differential pressure that results across the constriction. This method is widely used to measure flow rate in the transmission of gas or liquids trough pipelines, and has been used since Roman Empire times. The venturi effect is all example of Bernoulli's principle, in the case of incompressible fluid flow through a tube or pipe with a constriction in it. The fluid velocity must increase through the constriction to satisfy the equation of continuity, while its pressure must decrease due to conservation of energy: the gain in kinetic energy is supplied by a drop in pressure or a pressure gradient force. The effect is named after Giovanni Battista Venturi, (1746-1822), an Italian physicist.

Using Bernoulli's equation in the special case of incompressible fluids (such as the approximation of a water jet), the theoretical pressure drop at the constriction would be given by the formula:

$$(p2)(v_2^2 - v_1^2)$$

In addition, the flow sensor 74 can be fabricated from pressure sensor technology. Pressure sensors are used in numerous ways for control and monitoring in thousands of everyday applications. Pressure sensors can be used in systems to measure other variables such as fluid/gas flow, speed, water level, and altitude. Pressure sensors can alternatively called pressure transducers, pressure transmitters, pressure senders, pressure indicators among other names.

Pressure sensors can vary considerably in technology, design, performance, application suitability and cost. A conservative estimate would be that there may be over 50 technologies and at least 300 companies making pressure sensors worldwide.

There are also a category of pressure sensors that are designed to measure in a dynamic mode for capturing very high speed changes in pressure. Example applications for this type of sensor would be in the measuring of combustion pressure in a engine cylinder or in a gas turbine. These sensors are commonly manufactured out of piezoelectric materials like quartz.

Some pressure sensors function in a binary manner, i.e., when pressure is applied to a pressure sensor, the sensor acts to complete or break an electrical circuit. Some speed cameras use them. These types of sensors are also known as a pressure switches.

In addition, various flow measuring technologies can be utilized as the flow sensor 74. In general, a flow sensor is a device for sensing the rate of fluid flow. Typically a flow sensor is the sensing element used in a flow meter, or flow logger, to record the flow of fluids. There are various kinds of flow meters, including some that have a vane that is pushed by the fluid, and can drive a rotary potentiometer, or similar device. Other flow meters use a displacement piston, pushing it against a spring. Flow meters are related to devices called velocimeters that measure velocity of fluids flowing through them. Laser-based interferometry is often used for air flow measurement, but for liquids, it is often easier to measure the flow. Another approach is Doppler-based methods for flow measurement. Hall effect sensors may also be used, on a flapper valve, or vane, to sense the position of the vane, as displaced by fluid flow. A fluid dynamics problem is easily solved (especially in non-compressible fluids) by knowing the flow at all nodes in a network. Alternatively, pressure sensors can be placed at each node, and the fluid network can be solved by knowing the pressure at every node. These two situations are analogous to knowing the currents or knowing the currents at every node (noncompressible fluid being conserved in the same manner as Kirchoff's current or voltage laws, in which conservation of fluid is analogous to conservation of electrons in a circuit). Flow meters generally cost more than pressure sensors, so it is often more economical to solve a fluid dynamics network monitoring problem by way of pressure sensors, than to use flow meters.

In addition, there are several types of mechanical flow meters that can be utilized with the present invention as the flow sensor 74 that are listed below.

Piston Meter—Due to the fact that they used for domestic water measurement Piston meters, (also known as Rotary Piston, or Semi-Positive displacement meters) are the most common in the UK and are used for almost all meter sizes up to and including 40 mm (1½"). The piston meter operates on the principle of a piston rotating within a chamber of known volume. For each rotation, an amount of water passes through the piston chamber. Through a gear mechanism and, sometimes, a magnetic drive, a needle dial and odometer type display is advanced.

Woltmann Meter—Woltman meters, commonly referred to as Helix meters are popular at larger sizes. Jet meters (single or Multi-Jet) are increasing in popularity in the UK at larger sizes and are commonplace in the EU.

Dali Tube—A shortened form of the Venturi. Lower pressure drop than an orifice plate.

Orifice Plate—Another simple method of measurement uses an orifice plate, which is basically a plate with a hole through it. It is placed in the flow and constricts the flow. It uses the same principle as the venturi meter in that the differential pressure relates to the velocity of the fluid flow (Bernoulli's principle).

Pitot tube—Measurement of the pressure within a pitot tube in the flowing fluid, or the cooling of a heated element by the passing fluid are two other methods that are used. These types of sensors are advantageous in that they are rugged, so not easily damaged in an extreme environment. A pitot tube is an L shaped tube which is also able to measure fluid flow.

Paddle wheel—The paddle wheel translates the mechanical action of paddles rotating in the liquid flow around an axis into a user-readable rate of flow (gpm, lpm, etc.). The paddle tends to be inserted into the flow and can be used to generate electrical energy.

Pelton wheel—The Pelton wheel turbine (better described as a radial turbine) translates the mechanical action of the Pelton wheel rotating in the liquid flow around an axis into a user-readable rate of flow (gpm, lpm, etc.). The Pelton wheel tends to have all the flow travelling around it and can be used to generate electrical energy.

Turbine flow meter—The turbine flowmeter (better described as an axial turbine) translates the mechanical action of the turbine rotating in the liquid flow around an axis into a user-readable rate of flow (gpm, lpm, etc.). The turbine tends to have all the flow travelling around it.

Thermal mass flow meters—Thermal mass flow meters generally use one or more heated elements to measure the mass flow of gas. The gas temperature is also measured and compensated for. They provide a direct mass flow readout, and do not need any additional pressure temperature compensation over their specified range. Thermal mass flow meters are used for compressed air, nitrogen, helium, argon, oxygen, natural gas. In fact, most gases can be measured as long as they are fairly clean and non-corrosive.

Vortex flowmeters—Another method of flow measurement involves placing an object (called a shedder bar) in the path of the fluid. As the fluid passes this bar, disturbances in the flow called vortices are created. The vortices trail behind the cylinder in two rolls, alternatively from the top or the bottom of the cylinder. This vortex trail is called the Von Kármán vortex street after von Karman's 1912 mathematical description of the phenomenon. The speed at which these vortices are created is proportional to the flow rate of the fluid. Inside the shedder bar is a piezoelectric crystal, which produces a small, but measurable, voltage pulse every time a vortex is created. The frequency of this voltage pulse is also proportional to the fluid flow rate, and is measured by the flowmeter electronics. With f=SV/L where, f=the frequency of the vortices L=the characteristic length of the bluff body V=the velocity of the flow over the bluff body S=Strouhal Number and is a constant for a given body shape.

In addition, various magnetic, ultrasound and coriolis flow meters can be utilized with the present invention to function as the flow sensor 74. Modern innovations in the measurement of flow rate incorporate electronic devices that can correct for varying pressure and temperature (i.e. density) conditions, non-linearities, and for the characteristics of the fluid. The most common flow meter apart from the mechanical flow meters, is the magnetic flow meter, commonly referred to as a "mag meter" or an "electromag". A magnetic field is applied to the metering tube, which results in a potential difference proportional to the flow velocity perpendicular to the flux lines. The physical principle at work is Faraday's law of electromagnetic induction. The magnetic flow meter requires a conducting fluid, e.g. water, and an electrical insulating pipe surface, e.g. a rubber lined non magnetic steel tube.

Ultrasonic flow meters—Ultrasonic flow meters measure the difference of the transit time of ultrasonic pulses propagating in and against flow direction. This time difference is a measure for the average velocity of the fluid along the path of the ultrasonic beam. By using the absolute transit times both the averaged fluid velocity and the speed of sound can be calculated. Using the two transit times $t_{up}$ and $t_{down}$ and the distance between receiving and transmitting transducers L and the inclination angle α one can write the equations:

$$v = \frac{L}{2\sin(\alpha)} \frac{t_{up} - t_{down}}{t_{up} t_{down}} \text{ and } c = \frac{L}{2} \frac{t_{up} + t_{down}}{t_{up} t_{down}}$$

Where v is the average velocity of the fluid along the sound path and c is the speed of sound.

Measurement of the doppler shift resulting in reflecting an ultrasonic beam off the flowing fluid is another recent innovation made possible by electronics. By passing an ultrasonic beam through the tissues, bouncing it off of a reflective plate then reversing the direction of the beam and repeating the measurement the volume of blood flow can be estimated. The speed of transmission is affected by the movement of blood in the vessel and by comparing the time taken to complete the cycle upstream versus downstream the flow of blood through the vessel can be measured. The difference between the two speeds is a measure of true volume flow. A wide-beam sensor can also be used to measure flow independent of the cross-sectional area of the blood vessel.

Coriolis flow meters—Using the Coriolis effect causes a laterally vibrating tube to distort, a direct measurement of mass flow can be obtained in a coriolis flow meter. Furthermore a direct measure of the density of the fluid is obtained. Coriolis measurement can be very accurate irrespective of the type of gas or liquid that is measured; the same measurement tube can be used for hydrogen gas and peanut butter without recalibration.

Laser-doppler flow meter. Fluid flow can be measured through the use of a monochromatic laser diode. The laser probe is inserted into a tissue and turned on, where the light scatters and a small portion is reflected back to the probe. The signal is then processed to calculate flow within the tissues. There are limitations to the use of a laser doppler probe; flow within a tissue is dependent on volume illuminated, which is often assumed rather than measured and varies with the optical properties of the tissue. In addition, variations in the type and placement of the probe within identical tissues and individuals result in variations in reading. The laser doppler has the advantage of sampling a small volume of tissue, allowing for great precision, but does not necessarily represent the flow within an entire organ or instrument. The flow meter is more useful for relative rather than aboslute measurements.

Also shown in FIG. 3, is a timing sensor 72. The timing sensor can communicate with the CPU or microprocessor to display such information such as the time of day and current date and/or the totally duration that the water supply has been on before it was turned off. In order to monitor the initial time and duration of the water being delivered by the water supply line to the shower or bath head various timing measuring technologies are applicable to the present invention. For monitoring the initial time and duration of the water flowing through the shower or bath head, the use of various trip switches or water sensors 72 as depicted in FIG. 3 are positioned in close proximity to the water to be monitored and mounted within the articulating joint mechanism 22. Wires 77 are shown extending from the sensor 74 to electronically communicate with the CPU or microprocessor 84 and display unit. Various mechanical and magnetic switches can be utilized to communicate a signal to the CPU or microprocessor 84 that water supply has been initiated and then the software instructions and CPU or microprocessor can display the cumulative time that the water supply is flowing through the shower or bath head. The mechanical or magnetic switch will have the capability to also communicate a signal to the CPU or microprocessor 84 that the water supply has been shut off such that the software instructions and CPU or microprocessor can calculate various parameters, such as, but not limited to, the duration of water supply, total number of gallons or liters of water used and flow rates.

Technologies that can be use as the timing sensor 72 include electrical resistance sensors, ohm meter, multimeter electrical current sensors: galvanometer, ammeter, electrical voltage sensors: leaf electroscope, voltmeter electrical power sensors, watt-hour meters magnetism sensors, magnetic compass, fluxgate compass, magnetometer, Hall effect device. In addition, various chemical technologies, such as oxygen sonsors, ion-selective electrodes, and redox electrodes might be used. Furthermore, optical radiation technology can be used as the timing sensor, such as light sensors, on photo-detectors including semi-conduction devices such as photocells, photodiodes, phototransistors, CCDs, and image sensors; vacuum tube devices like photo-electric tubes, photomultiplier tubes, and mechanical instruments such as the Nichols radiometer, infra-red sensors, especially used as occupancy sensors for lighting and environmental controls, interferometry-interference fringes between transmitted and reflected light-waves produced by a coherent source such as a laser are counted and the distance is calculated. In addition, fiber optic sensors are capable of extremely high precision.

FIG. 4 is a perspective view of the second embodiment showing the display apparatus incorporated within the shower head in accordance with the present invention. It is anticipated by the Applicant that the technology of the present invention can also be incorporated within a faucet head (not shown).

In general, the display means 64, 66, and 68 utilizes (as presented in FIG. 4) utilizes one or more illuminating technologies, such as LCD, LED, gas plasma, fluorescence, incandescent, halogen, halide, or other lighting technologies but must able to provide sufficient lighting for observing the data in shower conditions. In addition, the display means must be able to sustain capability in moist wet conditions. The present invention can include one or more than one display parameter. For example, a unit with only the temperature display can be manufactured to reduce overall costs. Furthermore, the orientation of the parameters 64, 66, and 68 presented can be changed, for example, the flow parameter can be on top with the time parameter on the bottom and with the temperature parameter sandwiched between. The displays 64, 66, and 68 can have a background light that is used for various purposes, for example, for providing better lighting conditions or changing color e.g. from green to red, to display an alarming condition. Displaying of all water parameters 42, 44 and 46 can utilize a gang multiple LCD, LED, gas plasma, fluorescence, incandescent, halogen, halide, or other lighting technologies separate displays, custom displays, graphic displays or a single line display which sufficient digits that sequences the presentation of the water parameters 42, 44, and 46 one at a time with a specific delay and sequencing. An example of an LCD display unit that can be used with the present invention is the CFAF240320K-T-TS 244×320 graphic TFT display module which has a 2.4" diagonal, full color TFT marked by Crystalfontz America, Inc, located in Spokane Wash. Another example of a LCD unit that can be used with the present invention is the color graphic 128×128 LCD-00569 marketed by Sparkfun Electronics in Boulder, Colo. It is anticipated by the Applicants that there are other variants and other LCD, LED, OLED, gas plasma, fluorescence, incandescent, halogen, halide, or other lighting technologies that can be utilized with the present invention.

Not shown is the position or location of the temperature sensor 70, flow parameter sensor 72, and timing sensor 74. The technology described for the first embodiment 10 is incorporated by reference for the purpose of using this technology to perform the monitoring and measuring of water parameters for this second embodiment 60 of the present invention.

Also not shown in FIG. 4 (but described in more detail in 5, is an CPU or microprocessor and associated circuitry mounted on a electronic circuit board and contained within the shower bead to control the display means and communicate with the sensors. The CPU or microprocessor and associated circuitry mounted on the electronic circuit board can also have the capability to be programmed for controlling certain display means (e.g. U.S. or metric units), programming certain alarm or setting states (e.g. flash all display means red when the total volume has exceeded a certain volume, for example, 15 gallons).

Also not shown in FIG. 4, one or more ergonomically placed buttons or activators can be incorporated into the shower head to allow the modification of certain parameter units (e.g. metric to US), set alarm conditions (e.g. temperature over set point, time past set point, flow rate set points), input passwords or activation codes, suspend operations or to program certain settings, e.g. total shower time before shutdown or alarm, monitor continuous leakage (valve not complete shut oil). The buttons will communicate with the electronic circuit board contained with the shower head 60 and respond to programmed instructions integrated within the CPU or microprocessor and associated circuitry of the electronic circuit board. The buttons or activators should be mounted with the shower head with the capability to protect the buttons and electronic circuitry with the shower head for exposure to moist and wet conditions. It is anticipated that other means for providing communication to allow modification of certain parameters, input passwords or activation codes, suspend operations, enter programming steps, or other input features can be attained by means other than buttons or activators, such as utilizing LCD, LED or other technology display with push screen capabilities.

Shown surrounding the display means 64, 66, and 68, are plurality of holes 62 for projecting water or water spray from the water source for a typical shower dispensing process. The orientation of the display and plurality of holes is anticipated by the Applicant to be modified to accommodate various shower head designs.

FIG. 5 shows an electrical schematic showing the main power 87, power supply lines 85 and 86 for providing power to the CPU or microprocessor 84, the CPU or microprocessor 84, and the analog or digital display means 80 with a data transfer means 83 and with a power line 81 and a ground line 82 and a wireless communication means 101 having the capability or sending or receiving data from a remote receiver or transceiver. Power line 81 shows the optional use of a battery (or batteries) or as defined, could be used with standard line supplied alternating current or direct current. Standard voltages that can be used with the present invention include the range from 80 to 240 volts with a frequency of 50 to 60 Hz. Non-standard power lines such as mobile sources (ships, aircraft, buses, trains, etc.) can use alternating current at a frequency of 240 Hz or direct current at 12, 24, 48 or 72 volts. It is also anticipated by the Applicant that electrical energy can be generated from flowing water stream to provide instant energy or supplement the batteries. In this situation, a paddle wheel, Pelton wheel turbine, and other hydroelectric turbine technology of silicon chip turbine electric generators can be used with the present invention.

Also shown in FIG. 5 is a timing clock integrated circuit 88 with data transfer means 89 for communicating with the CPU or microprocessor 84 and having a power line 90 and ground line 91, a temperature integrated circuit 93 with a date transfer means 92 for communicating with the CPU or microprocessor 84 and having a power line 96 and ground 97, and the flow sensor (pressure) integrated circuit 95 with a data transfer means 94 for communicating with the CPU or microprocessor 84 with a power line 98 and ground line 99. The integrated circuits for the timing clock, temperature sensor and flow sensor can include circuitry to convert analog data to a digital format. The timing clock integrated circuit 88 can be incorporated within the CPU or microprocessor 84 and therefore not a separate IC as shown in FIG. 5.

The microprocessor that processes the information supplied by the temperature 70, flow 74 and timing 72 sensors uses internal instructions to control the information projected on the display 80 and for processing alarm states. The microprocessor can include an EEPROM or any type of memory section that allows for specific programming to be incorporated as processing instructions. Furthermore, the microprocessor may have the capability to convert analog signals into digital information for decoding and processing. An example of a microprocessor that could be used for the CPU or microprocessor is the PIC16F876 28-pin 8-Bin CMOS FLASH micro-controllers manufactured by Microchip Technology, Inc. This particular microprocessor has a 128K EEPROM Data memory bank for flash memory of specific instructions and utilizes a 35-word instruction set. It also has five 10-bit Analog-to-Digital Inputs that can provide the means for converting the information obtained from the temperature sensor 70, flow sensor 74, and/or timing sensor 72 from its analog format into a digitized form for processing by the instruction sets of the CPU or microprocessor 84. Another example of a microprocessor that could be used for the CPU or microprocessor is the MSP430 family of processors from Texas Instruments in Dallas, Tex. There are hundreds of variants but for an example, the MSP430F436IPN (80 pin package) or MSP430F436IPZ (100 pin package) could be utilized in the present invention. There are many other variants or other microprocessors, whether commercially marketed or privately fabricated, that can be used with the present invention.

In addition, a means to record the water parameters or data can be incorporated into the present invention. An integrated memory circuit can be incorporated into the CPU or microprocessor and associated circuitry with a means to transfer the recorded data to a removable media, such as a flash mounted on an electronic circuit board to control the display means and communicate with the sensors. The CPU or microprocessor and associated circuitry mounted on the electronic circuit board can also have the capability to be programmed for controlling certain display means (e.g. U.S. or metric units), programming alarm or setting states (e.g. flash all display means red when the total volume has exceeded a certain volume, for example, 15 gallons).

In addition, it is anticipated that the sensor analog (or digital) data that is communicated either through direct wiring or through a wireless means that is then amplified by a circuit and connected to the microprocessor 84 through one of the analog-to-digital modules (if necessary). It is also anticipated by the Applicants that the display means 20 of the first embodiment can be located remotely from the sensor and CPU or microprocessor 84 with data transfer means 83 communicated wirelessly. Hence, the data transfer mean 83 can be used to transfer water parameters to a remotely positioned receiver apparatus. It is also possible to have a local data means 20 together with a remotely located data data receiver apparatus. The data transfer means 83 can use radio-frequency, Bluetooth, WiFi, optical or other wireless technology for transferring the water parameter data generated by the sensors and collected by the microprocessor and sent to a wireless to a display means 20 and/or a remotely positioned receiver apparatus. Display means 20 and/or a remotely positioned receiver apparatus can have the function allows an individual or entity to review that data for auditing or monitoring purposes. This could be useful in commercial operations, such as in hotels, motels, work-out facilities or other commercial operations that allows individuals to use water supplies whereby the wireless transfer means or communication 83 can be sent to a remote receiver that displays or records the water parameters. For example, a particular hotel chain might allow guests to use a certain quantity of water for shower purposes, e.g. 35 gallons per day. Maids or other individuals having access to the individual's room can have a display means 20 that monitors and records the amount water used per day. If the individual uses 40 gallons per day, the hotel chain will have water parameter data to add an additional charge to the individual hotel bill for the additional water usage. Examples of Bluetooth modules (using the 2.4 GHz band as WiFi) that can be added to the present invention are the RN-41 Bluetooth modules available from Roving Networks in Los Gatos, Calif., the KC-41, KC 11.4, KC-5100, KC-216 or KC-225 data serial modules from KC Wireless in Tempe Ariz., and/or the BT-21 module from Amp'ed RF wireless solutions in San Jose, Calif. Examples of wireless protocols that can be utilized with the present invention include, but are not limited to, the IEEE 802.11a, IEEE 802.11b, IEEE 802.11g and IEEE 802.11n modulation techniques. Applicants recognize that there are numerous wireless protocols that have been developed that, although not specifically listed, could be utilized with the present invention for data transfer purposes.

In addition, the wireless or wire data transfer can be connected to the Internet using the IP or DHCP protocols whereby the data can be monitored remotely over the Internet using a software program designed to record, display, analyze and/or audit the water parameter data. The present invention would probably have to "log on" to a server to report the water parameters or it could respond to queries once its presence is known to the server.

Also some wireless routers support a form of "private" point-to-point or bridging operation which could be used to transfer water parameter data from the present invention to a receiving apparatus. Other kinds of proprietary protocols to be used with the present invention are possible as well. For example, there is the ISM (industrial, scientific and medical) bands The ISM bands are defined by the ITU-R in 5.138, 5.150, and 5.280 of the Radio Regulations. Individual countries' use of the bands designated in these sections may differ due to variations in national radio regulations. Because communication devices using the ISM bands must tolerate any interference from ISM equipment, these bands are typically given over to uses intended for unlicensed operation, since unlicensed operation typically needs to be tolerant of interference from other devices anyway. In the United States of America, ISM uses of the ISM bands are governed by Part 18 of the FCC rules, while Part 15 Subpart B contains the rules for unlicensed communication devices, even those that use the ISM frequencies. Part 18 ISM rules prohibit using ISM for communications.

| Frequency range [Hz] | Center frequency [Hz] | Availability |
|---|---|---|
| 6.765-6.795 MHz | 6.780 MHz | Subject to local acceptance |
| 13.553-13.567 MHz | 13.560 MHz | |
| 26.957-27.283 MHz | 27.120 MHz | |
| 40.66-40.70 MHz | 40.68 MHz | |
| 433.05-434.79 MHz | 433.92 MHz | Region 1 only |
| 902-928 MHz | 915 MHz | Region 2 only |
| 2.400-2.500 GHz | 2.450 GHz | |
| 5.725-5.875 GHz | 5.800 GHz | |
| 24-24.25 GHz | 24.125 GHz | |
| 61-61.5 GHz | 61.25 GHz | Subject to local acceptance |

-continued

| Frequency range [Hz] | Center frequency [Hz] | Availability |
|---|---|---|
| 122-123 GHz | 122.5 GHz | Subject to local acceptance |
| 244-246 GHz | 245 GHz | Subject to local acceptance |

While currently the 430 MHz and 900 MHz frequencies are commonly used in the US, it is anticipated by the Applicant that the other frequencies could be used for water parameter data transfers.

Another protocol known as CAN or CAN-bus (ISO 11898-1) was originally designed for automotive applications, but is now used in industrial applications. CAN is another type of network that can be used to transfer water parameter data. Devices that are connected by a CAN network are typically sensors, actuators and control devices. A CAN message never reaches these devices directly, but instead a host-processor and a CAN Controller is used between these devices and the bus.

Figure 6:
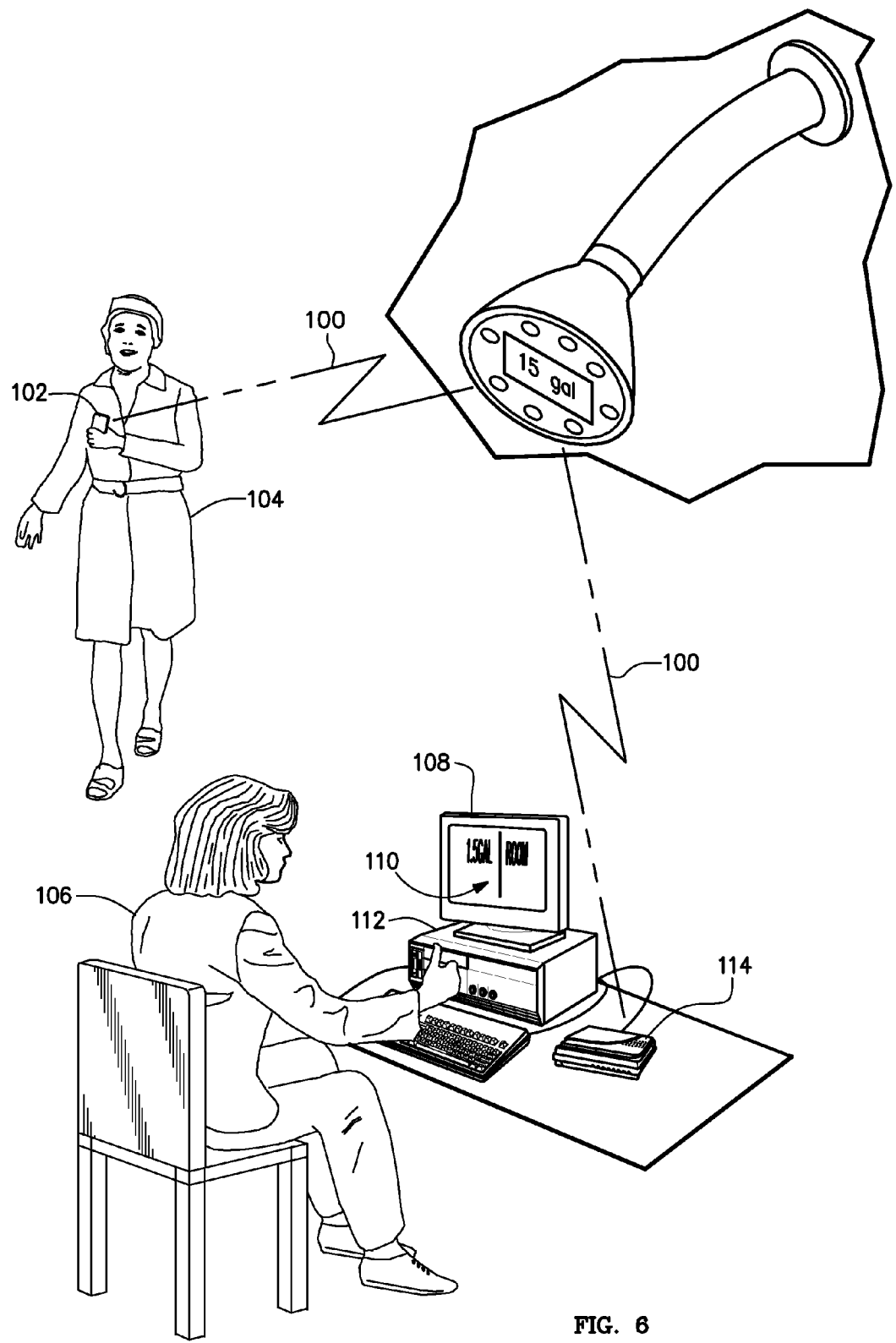
FIG. 6 is a perspective view of the display apparatus with wireless communication technology that can transfer water parameter data to a remote device or a computer system.

FIG. 6 shows a perspective view of the display apparatus 10 with wireless communication technology 100 that can transfer data to a remote device 102 or a computer system 108. In regards to the remote device 102, in a example hotel or motel setting, a maid or worker 104 who has access to an individual's room, can use the transceiver wireless communication technology 100 to monitor the amount of water used per day or per stay (multiple days). The remote device 102 would incorporate much of the technology described herein, including display technology, microprocessor and electrical circuitry, and wireless technology that is battery powered. The remote device 102 could first send a signal to the display apparatus 10 requesting a download of water parameter data to the remote apparatus 102. Once water parameter data is downloaded, a confirmation signal, visual and/or auditory, could be generated on the remote. Also, once a download of water parameter data is completed, the remote apparatus or the display apparatus could make a record of the downloading event to prevent duplication of downloads or to provide organizational capabilities (such a confirming maid or worker is in compliance with policies or procedures).

Figure 7:
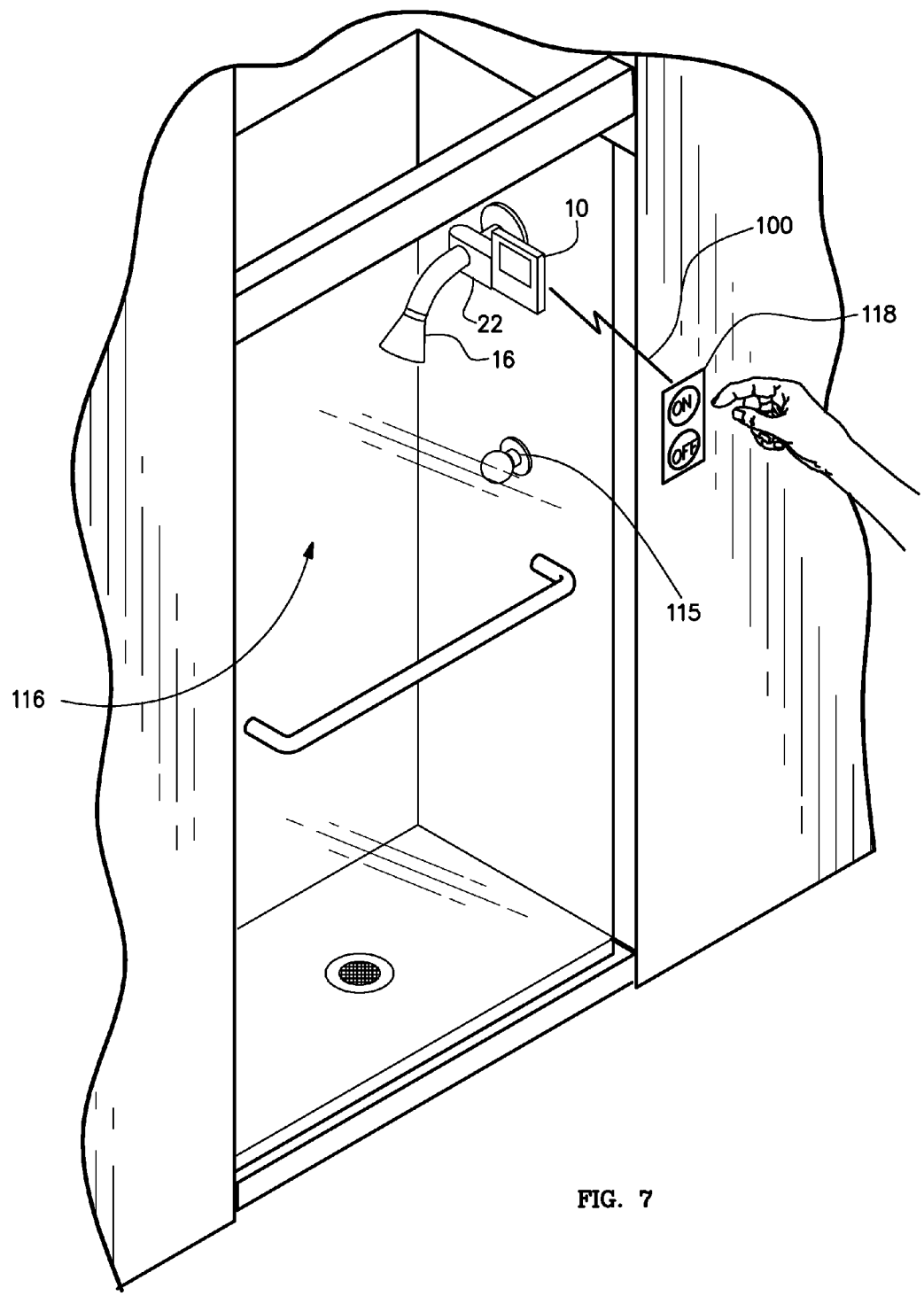
FIG. 7 is a perspective view of the display apparatus with wireless communication technology showing the remote activation and de-activation of the water control means with the use of a remote transceiver.

FIG. 7 is a perspective view of a shower enclosure 116, the display apparatus 10 with wireless communication technology 100, and showing the remote activation and/or de-activation of the water control means with the use of a remote transceiver 118. Also shown is the primary water control valve 115. The remote transmitter or transceiver 118 would incorporate much of the technology described herein, such as control buttons, keypads, or LCD touch screen technology, microprocessor and electrical circuitry, and wireless technology that is battery powered. FIG. 7 depicts the remote transceiver 118 shown in a location near the shower area 116, but it is anticipated by the Applicant that the remote transceiver 118 can be remotely located, such as next to an individual bed or near an alarm clock or alarm apparatus. The remote transceiver 118 can send a wireless signal 100 to the display apparatus 10 instructing the display apparatus 10 to turn on or turn off the shower using the water control means. The display apparatus 10 can wirelessly communicate water parameter data to the remote transceiver 118, such as confirming that the set temperature has been reached or provide other types of water parameter information.

Figure 8:
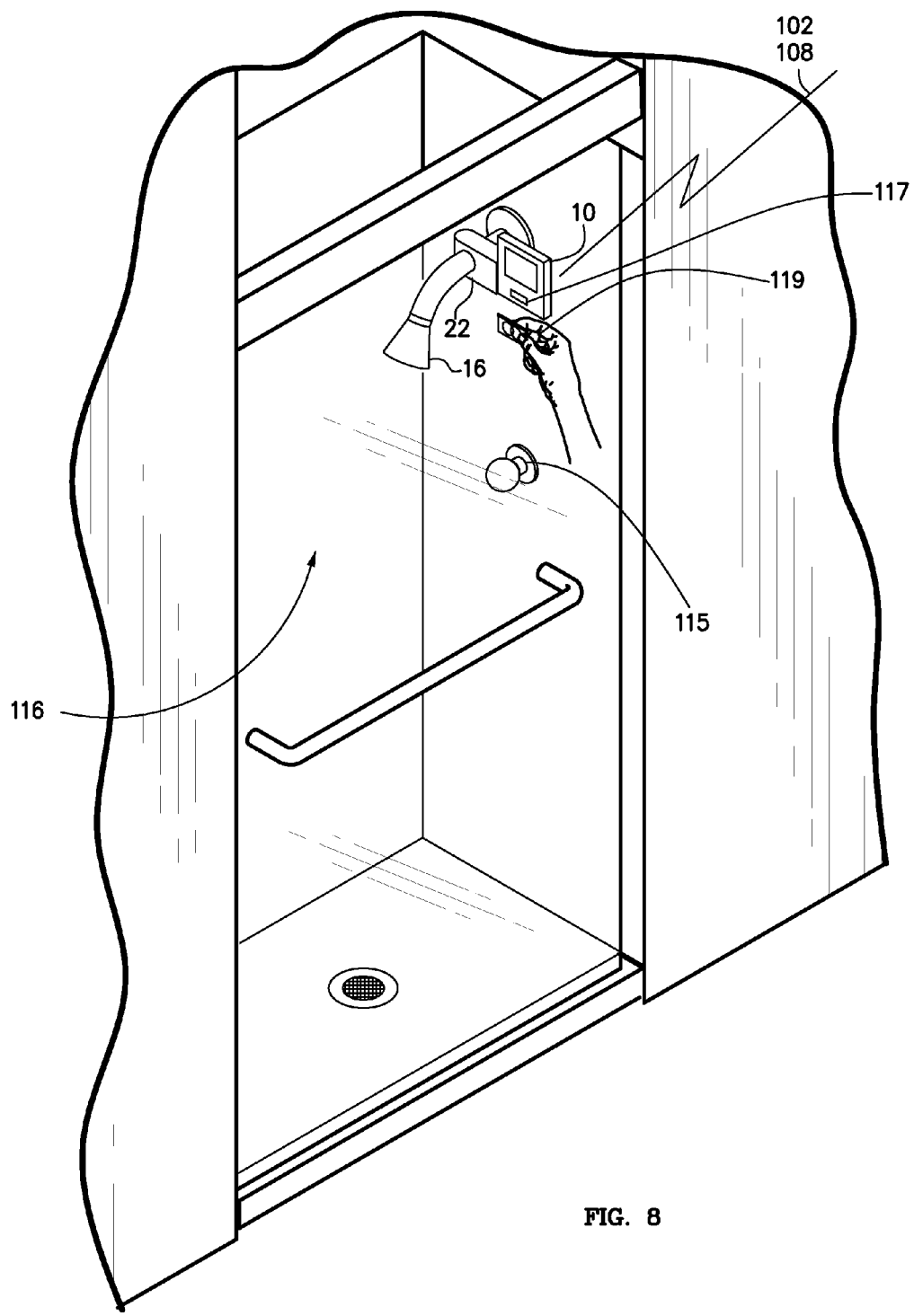
FIG. 8 is a perspective view of the display apparatus with wireless communication technology showing a date card used to activate the programmable features or to gain access to use the shower.

FIG. 8 is a perspective view of the display apparatus 10 with wireless communication technology, showing an identification card or electronic card 119 and an electronic reader 117 to activate and/or deactivate the supply water, use programmable features, or to gain access to use the shower apparatus. As shown, the electronic reader 117 is incorporated in the water parameter display apparatus 10, but it is anticipated that the electronic reader 117 could be located remotely and communicate with the electric circuitry and microprocessor by wireless technology or hard wired. In certain settings, such as hotels and motels, gyms and exercise facilities, institutional facilities including hospitals and health care, school dormitories and exercise facilities, public restrooms or hygiene facilities, and government facilities such as barracks, ships, military housing, and prisons, where there may be the need to verify an individual who desires to use the shower or lavatory services and/or use other water sources. In many instances, the individual has a membership card or authorization electronic or detection card that could be use in the method of use. The method of using the present invention is to initially collect or verify use with identification methods such as password, electronic card, keypad, or fingerprint, to gain access to the present invention display apparatus (e.g. turn on the water, program the apparatus). In addition, other biometric technology (e.g. eye scan, face scan) can be employed to activate the water control means. The display apparatus can simply be programmed to allow access (activate the water control means and timer) or may communicate wired or wirelessly with a computer system (activate the water control means and send water parameter use to a remote computer system). In addition, the identification or electronic card, or biometric technology 119 can be used to gain access to programmable features of the present invention apparatus.

Various techniques and technology of identification cards or electronic cards 119 are available to use with the present invention. Identification cards or contact smart cards 119 (cards with microchip) generally use ISO 7816 interface where the microchip is located within a contact zone, which consists of a few small contact petals. When the card 119 is inserted into the input reader located on the apparatus 117, the chip adjoins with electric connectors and the input reader can receive or review and/or download the chip information contained within the microchip. Standard ISO/IEC 7816 also regulates exchange reports and some aspects of work with the other smart cards data. Such cards 119 are used for the holder authorization (e.g. activate the water control means and begin the timing sequence). Contactless pass card 119 technology can also be used with the present invention. For example, an electronic key or eTokens are personal authentication tools that support digital certificates and use an electronic digital signature. These are smart cards 119 that can communicate with the reader 117 through RFID (Radio Frequency Identification) technology. The RFID card must be in relatively close proximity to the reader 117 to perform necessary operations.

Electronic card technology 119 is one type of activation means that can be used with the present invention. Electronic cards 119 with program-controlled cartographical images are visualized with the use of programs. The electronic card 119 is constructed on the basis of the digital card data or databases of geographical information systems (GIS). Digital topographic geodesic electronic cards 119 can be represented by either Raster or Vector techniques. The Raster technique is an electronic plan, and it's cartographic information is presented by the matrix, whereby the matrix's elements are codes of the cartographical image colors. Raster electronic plans are created by traditional topographical materials scanning or vector digital district models of rasterization. Raster materials can be black-and-white, gray-scale and/or have multiple colors. Vector electronic techniques use the electronic plan cards, but its cartographical information is presented by the sequence of vectors. Vector electronic plans are created on the basis of automated methods or by graphic representation of traditional plans scanning and subsequent vectoring.

Barcode technology, another technology that can be used with the present invention, is an optical machine-readable representation of data, which shows information regarding the object to which it attached. In this embodiment, the barcodes can be, for example, an exercise facility pass card, that can be used in the shower facilities, whereby the bar card 119 is passed in front of the bar card reader 117 located in a convenient location on or near the present invention apparatus. It can be used to identify and authorize individuals to activate the present invention or gain access to programmable features of the present invention. Originally barcodes represented data by varying the widths and spaces between parallel lines, and this form of barcodes is commonly referred to as linear or one-dimensional (1D). Subsequently, bar code technology evolved into rectangles, dots, hexagons and other geometric configurations in two dimensions (2D). Although 2D systems use a variety of symbols, they are generally referred to as barcodes as well. Barcodes originally were scanned by special optical scanners called barcode readers; later, scanners and interpretive software became available on devices including desktop printers and smart phones. Other systems have made inroads in the bar code market, with the introduction of technologies such as radio frequency identification, or RFID. Barcode scanners can be used in Google's mobile Android or Apple's operating system, appropriate applications or with third party barcode scanners.

In addition, several biometric techniques could also be used with the present invention to activate the water control means or program features of the present invention. In particular, fingerprint recognition or fingerprint authentication refers to the automated method of verifying human fingerprints. In this embodiment, once an individual's fingerprint is programmed for authorization, it can be used in the shower facilities whereby the fingerprint (not shown) is passed in front of the fingerprint reader 117 located in a convenient location on the present invention apparatus for activation, deactivation and/or programming means. Fingerprints are one of many forms of biometrics used to identify individuals and verify their identity. Generally, there are two major classes of algorithms (minutia and pattern) and four sensor designs (optical, ultrasonic, passive capacitance, and active capacitance). The analysis of fingerprints for matching purposes generally requires the comparison of several features of the print pattern. These include patterns, which are summarization of ridges, and minutia points, which are unique features found within the patterns. It may also be necessary to know the structure and properties of human skin in order to successfully employ some of the imaging technologies. The three basic patterns of fingerprint ridges are the arch, loop, and whorl. The arch are ridges that enter from one side of the finger, rise in the center forming an arc, and then exit the other side of the finger. The loops are ridges enter from one side of a finger, form a looping curve, and then exit on that same side. And the whorls are ridges formed circularly around a central point on the finger.

It is also anticipated by the Applicant the other biometric techniques, such as eye or iris scans and/or face scans, can be used for verification purposes.

A fingerprint sensor 117 on the present invention apparatus is an electronic apparatus used to capture a digital image of the fingerprint pattern. The scan is digitally processed to create a biometric template (a collection of extracted features) which is stored and used for matching. Below are descriptions of typically used fingerprint sensor technologies that could be incorporated into the present invention for individual identification and authorization.

Optical fingerprint imaging involves capturing a digital image of the print using visible light. This type of sensor is a type of digital camera. The top layer of the sensor, where the finger is placed, is known as the touch surface. Beneath this layer is a light-emitting phosphor layer which illuminates the surface of the finger. The light reflected from the finger passes through the phosphor layer to an array of solid state pixels (a charge-coupled device) which captures a visual image of the fingerprint. A scratched or dirty touch surface can cause a bad image of the fingerprint. A disadvantage of this type of sensor is the fact that the imaging capabilities are affected by the quality of skin on the finger. For instance, a dirty or marked finger is difficult to image properly. Moving the finger across the sensor at an angle or too fast also cause problems. Also, it is possible for an individual to erode the outer layer of skin on the fingertips to the point where the fingerprint is no longer detectable. This optical imaging can sometimes also be fooled by an false image of a fingerprint.

Ultrasonic sensors make use of the principles of medical ultrasonic technology to create visual images of the fingerprint. Unlike optical imaging described above, ultrasonic sensors use very high frequency sound waves to penetrate the epidermal layers of skin. The sound waves are generated using piezoelectric transducers, and reflected energy is also measured using piezoelectric readers. Since the dermal skin layer exhibits the same characteristic pattern of the fingerprint, the reflected wave measurements can be used to form an image of the fingerprint. This eliminates the need for clean, undamaged epidermal skin and a clean sensing surface, and may work better in steam/wet conditions.

Capacitance sensors utilize the principles associated with capacitance in order to form fingerprint images. In this method of imaging, each sensor contains an array of pixels that acts as one plate of a parallel-plate capacitor, the dermal layer (which is electrically conductive) acts as the other plate, and the non-conductive epidermal layer acts as a dielectric. Capacitance sensor technology is further divided into two groups, passive and active. A passive capacitance sensor uses the principle outlined above to form an image of the fingerprint pattern on the dermal layer of skin. The capacitance varies between the ridges and valleys of the fingerprint due to the fact that the volume between the dermal layer and sensing element in valleys contains identifiable air gap. The dielectric constant of the epidermis and the area of the sensing element are known values. The measured capacitance values are then used to distinguish between fingerprint ridges and valleys. Active capacitance sensors use a charging cycle to apply a voltage to the skin before measurement takes place. The application of voltage charges the effective capacitor. The electric field between the finger and sensor follows the pattern of the ridges in the dermal skin layer. On the discharge cycle, the voltage across the dermal layer and sensing element is compared against a reference voltage in order to calculate the capacitance. The distance values are then calculated mathematically, and used to form an image of the fingerprint. Like the ultrasonic methods, active capacitance sensors measure the ridge patterns of the dermal layer. Again, this eliminates the need for clean, undamaged epidermal skin and a clean sensing surface.

Matching algorithms are used to compare previously stored templates of fingerprints against candidate fingerprints for authentication purposes. This method requires that either the original image must be directly compared with the candidate image, or certain features must be compared. Pattern based algorithms compare the basic fingerprint patterns (arch, whorl, and loop) between a previously stored template and a scanned fingerprint. The images must be aligned in the same orientation. To accomplish this, the algorithm finds a central point in the fingerprint image and centers on that point. In a pattern-based algorithm, the template contains the type, size, and orientation of patterns within the aligned fingerprint image. The candidate fingerprint image is graphically compared with the template to determine the degree to which they match. Such software for matching algorithms can be stored within a memory chip in the electronic circuitry or be accessed wirelessly (or wired) from a remote computer.

The contemplated uses for identification via electronic card technology with the present invention comprise establishing communication of the electronic card with the scanning window of the water display apparatus to activate the water control means (wrong or expired card will not activate the water control means). The water display apparatus could have a programmed timing period that regulates the shower period, and the user can use the entire period or a shorter period by turning off the water valve. Alternately, the shower timing period could be un-regulated but the water parameters, e.g. water flow, time and water use, could be written to the card for subsequent reading, or there could be a prepaid amount of water use that could be adjusted for each use. When the prepaid time is exhausted, activation would not be allowed until the prepaid time is replenished. In addition, the optional wireless communication means 100 could be used to track water use. In this situation, the electronic card could establish communication with the scanning window on the water display apparatus and the water display apparatus established wireless (or wired) communication with a remote device or computer, and then the water use could be regulated wirelessly by a remote device or computer. After activation, the remote device or computer could allow a pre-determined time period of water use and then send a signal back to the display apparatus to turn off the water control means. Alternately, the shower timing period could be un-regulated but the water parameters, e.g. water flow, time and water use, could be sent to the remote device or computer for recording water use for subsequent purposes, such as billing for water use, or recording for ecological or environmental purposes.

In regards to biometric finger printing techniques, the fingerprint algorithms software can reside within the electronic circuitry of the water display apparatus. The database of registered fingerprint data could be also stored in the water display apparatus or, alternately, the database of fingerprint data could be stored remotely on a device or computer and communicated wirelessly (or wired) to the water display apparatus. In this situation, swiping the finger (properly) across the scanning window will send a request to the remote device or computer for analysis and verification of the fingerprint. Once verified, the remote device or computer will send a signal to activate the water display apparatus. Incorrect scanning of the finger (e.g. too fast, wrong angle) would initiate an audio and/or visual error signal or message. The contemplated uses with the present invention comprise the steps of establishing verification of finger print or other biometric technology using the scanning window of the water display apparatus to activate the water control means (wrong or incorrect fingerprint, eye scan, or face scan will not activate the water control means). The water display apparatus could have a programmed timing period that regulates the shower period, and the user can use the entire period or a shorter period by turning off the water valve. In addition, the optional wireless communication means 100 could be used to track water use. In this situation, once the fingerprint establishes verification communication with the scanning window on the water display apparatus, the water display apparatus then established wireless (or wired) communication with a remote device or computer, and then the water use can be regulated wirelessly by a remote device or computer. After activation, the remote device or computer can allow a pre-determined time period of water use and then send a signal back to the display apparatus to turn off the water control means. Alternately, the shower timing period could be un-regulated but the water parameters i.e. water flow, time and water use, could be sent to the remote device or computer for recording water use for subsequent purposes, such as billing for water use, or recording for ecological or environmental purposes.

Many hotels and motels now have a central electrical control that requires the hotel electronic key card to be placed in an electronic card receptacle or an electronic access card reader in order to allow use of the electronic devices in the hotel or motel room. When the electronic card is removed from the receptacle or an electronic access card reader, a delay allows the electricity to remain on for a period of time. This process conserves electricity as many individuals leave on air or heat conditioning, televisions, or other electronic devices when they leave the room. This same process could be used with the present invention. A central operable water valve which communicates with an electronic card receptacle controls the access to all water in the hotel or motel room. When a registered guest is in the room with the hotel or motel key card in the receptacle or an electronic access card reader, the central water valve allows use of the water supply to access the showers, water faucets, and/or toilets to function (alternately the system can be designed to allow certain of these devices, such as toilets or water faucets, to function when the hotel or motel key is removed from the receptacle). When the register guest leaves the room and the electrical key card is removed from the electronic key card receptacle, the water control valve could have a predetermined delay that continues water use for a period. This process conserves waters by not allowing individuals to run shower or faucets when not they are not in the room and can serve to save water in case of leaking toilets, faucets, and/or shower valves. It is anticipated that institutional functions such as hospitals, college and school dormitories, high school hygiene facilities and governmental functions such as barracks, ships, military housing, and prisons could also benefit from the procedures described for motels and hotels in this paragraph. It is also conceived that homes and commercial operations can benefit from water activation and deactivation means.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure that arise from known or customary practice and the art to which this invention pertains and which fall within the limits of the appended claims.

The invention claimed is:

1. A water dispensing apparatus located in close proximity to or incorporated within a shower, bath or faucet head, comprising:

a shower, bath or faucet head;

a housing that contains a display means, said a display means having the capability to visually display one or more water parameters, said housing also contains electrical circuitry, a timing circuit, a microprocessor and power supply, said housing in engaged or in close proximity to said shower, bath or faucet head;

at least one water flow sensor that is in close proximity to, or in hydraulic communication with, said water supply, and said sensor in electrical communication and with said microprocessor;

said microprocessor having software instructions designed to measure and simultaneously display, when water flow is initiated a water use parameter and a timing parameter in a cumulative format;

an identification or electronic card, barcode formatted card or radio frequency identification (RFID) chip or tag reader, said identification or electronic card, bar formatted, card, or radio frequency identification (RFID) chip or tag reader designed to communicate with an corresponding identification or electronic card, bar formatted card or radio frequency identification (RFID) chip or tag that encodes unique authorization data;

a first water control means; and said identification or electronic card, bar formatted card, or radio frequency identification (RFID) chip or tag reader in electronic communication with a remote computer system, said remote computer system monitoring the timing parameter and/or the water use parameter, said remote computer designed to execute computer instructions to activate or deactivate the water flow using said first water control means, said electronic communication being wireless, wired, and/or internet means.

2. The water dispensing apparatus as recited in claim 1, wherein said water dispensing apparatus has the capability to record, store and/or perform calculations regarding said water use when said identification or electronic card, barcode formatted card, or radio frequency identification (RFID) chip or tag has activated the water flow.

3. The water dispensing apparatus as recited in claim 1, wherein said water flow is activated when the identification or electronic card barcode card, radio frequency identification (RFID) chip or tag is located or engaged with the identification or electronic card barcode card, radio frequency identification (RFID) chip or tag reader and the water flow is deactivated when said identification or electronic card barcode card, radio frequency identification (RFID) chip or tag is removed or not in close proximity to said identification or electronic card barcode card, radio frequency identification (RFID) chip or tag reader.

4. The water dispensing apparatus as recited in claim 1, further comprising a temperature sensor, wherein said software instructions are designed to measure and display temperature parameter on said display means.

5. The water dispensing apparatus as recited in claim 1, wherein the identification or electronic card, barcode formatted card, or radio frequency identification (RFID) chip or tag reader is located remotely from the dispensing apparatus and communicates with the electrical circuitry and microprocessor wirelessly or by hard wired technology.

6. The water dispensing apparatus as recited in claim 1, wherein water use and timing data are transfer wirelessly or hard wired to a remote device or computer that records the water use and timing data.

7. The water dispensing apparatus as recited in claim 1, further comprising a second water control means that communicates wirelessly or with wired technology and is located at the main water supply line.

8. A water dispensing apparatus for attaching to the water supply line, comprising:
a housing which contains electrical circuitry, a timing circuit, a microprocessor and power supply, said housing engaged or in close proximity to a water supply line;

at least one water flow sensor that is in close proximity to, or in hydraulic communication with, said water supply, and said sensor in electrical communication and with said microprocessor;

said microprocessor having software instructions designed to measure and simultaneously display, when water flow is initiated, a water use parameter and a timing parameter in a cumulative format;

an identification or electronic card, barcode formatted card or radio frequency identification RFID card or tag reader, said identification or electronic card, bar formatted, card, or radio frequency identification (RFID) card or tag reader designed to communicate with an corresponding identification or electronic card, bar formatted card or radio frequency identification (RFID) tag that encodes unique authorization data;

a first water control means; and said identification or electronic card, bar formatted card, or radio frequency identification (RFID) chip or tag reader in electronic communication with a remote computer system, said remote computer system monitoring the timing parameter and/or the water use parameter, said remote computer designed to execute computer instructions to activate or deactivate the water flow using said first water control means, said electronic communication being wireless, wired, and/or internet means.

9. The water dispensing apparatus as recited in claim 8, wherein said water dispensing apparatus has the capability to record, store and/or perform calculations regarding said water use when said identification or electronic card, barcode formatted card, or radio frequency identification (RFID) chip or tag has activated the water flow.

10. The water dispensing apparatus as recited in claim 8, wherein the identification or electronic card, barcode formatted card, or radio frequency identification (RFID) card or tag reader is located remotely from the dispensing apparatus and communicates with the electrical circuitry and microprocessor wirelessly or by hard wired technology.

11. The water dispensing apparatus as recited in claim 8, wherein water use and timing data are transfer wirelessly or hard wired to a remote device or computer that records the water use and timing data.

12. The water dispensing apparatus as recited in claim 8, further comprising a second water control means that communicates wirelessly or with wired technology and is located at the main water supply line.

13. A water dispensing apparatus located in close proximity to or incorporated within a shower, bath or faucet head, comprising:
a shower, bath or faucet head;
a housing that contains first display means, said first display means having the capability to visually display one or more water parameters, said housing also contains electrical circuitry, a timing circuit, a microprocessor and power supply, said housing in engaged or in close proximity to said shower, bath or faucet head;

at least one water flow sensor that is in close proximity to, or in hydraulic communication with, said water supply, and said sensor in electrical communication and with said microprocessor;

said microprocessor having software instructions designed to measure and simultaneously display, when water flow is initiated, a water use parameter and a timing parameter in a cumulative format;

a biometric technology reader, said biometric technology reader designed to communicate with a biometric finger, face, eye or other form of biometrics used to identify individuals that encodes unique authorization data;

a first water control means; and said biometric reader in electronic communication with a remote computer system, said remote computer system monitoring the timing parameter and/or the water use parameter, said remote computer designed to execute computer instructions to activate or deactivate the water flow using said first water control moans, said electronic communication being wireless, wired, and/or internet means.

14. The water dispensing apparatus as recited in claim 13, wherein the biometric technology reader is located remotely from the dispensing apparatus and communicates with the electrical circuitry and microprocessor wirelessly or by hard wired technology.

15. The water dispensing apparatus as recited in claim 13, wherein water use and timing data are transfer wirelessly or hard wired to a remote device or computer that records the water use and timing data.

16. The water dispensing apparatus as recited in claim 13, further comprising a second water control means that communicates wirelessly or with wired technology and is located at the main water supply line.

17. A water dispensing apparatus for attaching to the water supply line, comprising:

a housing which contains electrical circuitry, a timing circuit, a microprocessor and power supply, said housing engaged or in close proximity to a water supply line;

at least one water flow sensor in hydraulic communication with said water supply, and said sensor in electrical communication and with said microprocessor;

said microprocessor having software instructions designed to measure and simultaneously display, when water flow is initiated, a water use parameter and a timing parameter in a cumulative format;

biometric technology reader, said biometric technology reader designed to communicate with a biometric finger, face, eye or other form of biometrics used to identify individuals that encodes unique authorization data;

a first water control means; and said biometric reader in electronic communication with a remote computer system, said remote computer system monitoring the timing parameter and/or the water use parameter, said remote computer designed to execute computer instructions to activate or deactivate the water flow using said first water control means, said electronic communication being wireless, wired, and/or internet means.

18. The water dispensing apparatus as recited in claim 17, wherein the biometric technology reader is located remotely from the dispensing apparatus and communicates with the electrical circuitry and microprocessor wirelessly or by hard wired technology.

19. The water dispensing apparatus as recited in claim 17, wherein water use and timing data are transfer wirelessly or hard wired to a remote device or computer that records the water use and timing data.

20. The water dispensing apparatus as recited in claim 17 further comprising a second water control means that communicates wirelessly or with wired technology and is located at the main water supply line.

21. The water dispensing apparatus as recited in claim 13, said water dispensing apparatus has the capability to record, store and/or perform calculations regarding said water use when said identification or electronic card, barcode formatted card, or radio frequency identification (RFID) chip or tag has activated the water flow.

22. The water dispensing apparatus as recited in claim 17, said water dispensing apparatus has the capability to record, store and/or perform calculations regarding said water use when said identification or electronic card, barcode formatted card, or radio frequency identification (RFID) chip or tag has activated the water flow.

23. The water dispensing apparatus as recited in claim 1, wherein the authorization additionally requires a key pad apparatus which is located on the apparatus or is located in a soft button format on the display means.

24. A water dispensing apparatus located in close proximity to or incorporated within a shower, bath or faucet head, comprising:

a shower, bath or faucet head;

a housing that contains a display means, said a display means having the capability to visually display one or more water parameters, said housing also contains electrical circuitry, a timing circuit, a microprocessor and power supply, said housing engage or in close proximity to said shower, bath or faucet head;

at least one water flow sensor that is in close proximity to, or in hydraulic communication with, said water supply, and said sensor in electrical communication and with said microprocessor;

said microprocessor having software instructions designed to measure and simultaneously display, when water flow is initiated, a water use parameter and a timing parameter in a cumulative format;

an identification or electronic card, barcode formatted card or radio frequency identification (REID) chip or tag reader, said identification or electronic card, barcode formatted card, or radio frequency identification (REID) chip or tag reader designed to communicate with an corresponding identification or electronic card, bar formatted card or radio frequency identification (RFID) chip or tag that encodes unique authorization data;

a first water control means;

said identification or electronic Card, bar formatted card, or radio frequency identification (RFID) chip or tag reader in electronic communication with a remote computer system, and upon encoding the unique data, said reader initiates an activation process, said electronic communication being wireless, wired, and/or internet means, and a key pad apparatus designed, upon the proper entry of one or more key strokes, to complete, the activation process, said remote computer system monitoring the volume of water used and/or the timing parameter to execute computer instructions for activating or deactivating said first water control means, said key pad in electronic communication with said reader or said remote computer system, and said electronic communication being wireless, wired and/or internet means.

25. The water dispensing apparatus as recited in claim 8, wherein said housing is in communication with water control means the that supplies shower, sinks, faucets and toilets.

26. A water dispensing apparatus for attaching to the water supply line, comprising:

a housing which contains electrical circuitry, a timing circuit, a microprocessor and power supply, said housing engaged or in close proximity to a water supply line;

at least one water flow sensor that is in close proximity to, or in hydraulic communication with, said water supply, and said sensor in electrical communication and with said microprocessor;

said microprocessor having software instructions designed to measure and simultaneously display, when water flow is initiated, a water use parameter and a timing parameter in a cumulative format;

an identification or electronic card, barcode formatted card or radio frequency identification RFID card or tag reader, said identification or electronic card, bar formatted card, or radio frequency identification (RFID) card or tag reader designed to communicate with an corresponding identification or electronic card, bar formatted card or radio frequency identification (RFID) tag that encodes unique authorization data;

a first water control means; and said identification or electronic card, bar formatted card, or radio frequency identification (RFID) chip or tag reader in electronic communication with a remote computer system, and upon encoding the unique data, said reader initiates an activation process, said electronic communication being wireless, wired, and/or internet means and a key pad apparatus designed, upon the proper entry of one or more key strokes, to complete, the activation process, said remote computer system monitoring the volume of water used and/or the timing parameter to execute computer instructions for activating or deactivating said first water control means, said key pad in electronic communication with said reader or said remote computer system, and said electronic communication being wireless, wired and/or internet means.

27. The water dispensing apparatus as recited in claim 8, wherein said water flow is activated when the identification or electronic card barcode card, radio frequency identification (RFID) chip or tag is located or engaged with the identification or electronic card barcode card, radio frequency identification (RFID) chip or tag reader and the water flow is deactivated when said identification or electronic card barcode card, radio frequency identification (RFID) chip or tag is removed or not in close proximity to said identification or electronic card barcode card, radio frequency identification (RFID) chip or tag reader.

28. The water dispensing apparatus as recited in claim 8, further comprising a temperature sensor, wherein said software instructions are designed to measure and display temperature parameter on said display means.

* * * * *